United States Patent
Butterworth et al.

(10) Patent No.: US 6,907,454 B1
(45) Date of Patent: Jun. 14, 2005

(54) DATA PROCESSING SYSTEM WITH MASTER AND SLAVE PROCESSORS

(75) Inventors: Henry Esmond Butterworth, Chandlers Ford (GB); Carlos Francisco Fuente, Portsmouth (GB); Robert Bruce Nicholson, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,962

(22) Filed: Apr. 19, 2000

(30) Foreign Application Priority Data

Dec. 23, 1999 (GB) .............................. 9930282

(51) Int. Cl.⁷ .............................................. G06F 15/16
(52) U.S. Cl. ...................... 709/208; 709/213; 712/31
(58) Field of Search ................................ 710/110, 307; 712/31, 34; 709/213, 310, 208; 713/322; 711/220, 1, 117; 379/399.01

(56) References Cited

U.S. PATENT DOCUMENTS

| | | | |
|---|---|---|---|
| 4,853,847 A | | 8/1989 | Ohuchi ......................... 364/200 |
| 4,878,166 A | * | 10/1989 | Johnson et al. .............. 710/307 |
| 5,584,010 A | * | 12/1996 | Kawai et al. ................ 711/117 |
| 5,752,068 A | * | 5/1998 | Gilbert ......................... 712/16 |
| 5,940,876 A | * | 8/1999 | Pickett ......................... 711/220 |
| 6,009,493 A | * | 12/1999 | Fujiyama ........................ 711/1 |
| 6,144,995 A | * | 11/2000 | Maya et al. .................. 709/213 |
| 6,263,075 B1 | * | 7/2001 | Fadavi-Ardekani et al. ..... 379/399.01 |
| 6,330,658 B1 | * | 12/2001 | Evoy et al. .................... 712/31 |
| 6,363,444 B1 | * | 3/2002 | Platko et al. ................. 710/110 |
| 6,377,979 B1 | * | 4/2002 | Yamashita et al. ........... 709/213 |
| 6,393,572 B1 | * | 5/2002 | Datta et al. .................. 713/322 |
| 6,442,671 B1 | * | 8/2002 | Faucon et al. ................. 712/34 |
| 6,513,070 B1 | * | 1/2003 | Kozlowski et al. .......... 709/310 |

* cited by examiner

*Primary Examiner*—John Follansbee
*Assistant Examiner*—Jungwon Chang
(74) *Attorney, Agent, or Firm*—Scully, Scott, Murphy & Presser; Satheesh K. Karra, Esq.

(57) ABSTRACT

A data processing system comprises a master processor (10), a slave processor (30), a memory (50), and a bus subsystem (20) interconnecting the master processor (10), the slave processor (30), and the memory (50). The master processor (10) is configured to generate, in response to a memory access instruction, a read request comprising a read command for execution by the slave processor (30) to read data stored in a location in the memory (50) specified by the memory access instruction, and to write the read request to the slave processor (30) via the bus subsystem (20). The slave processor (30) is configured to execute the read command received in the read request from the master processor (10) to obtain the data stored at the specified location in the memory (50) and to write the data thus obtained to the master processor (10) via the bus subsystem (20).

4 Claims, 4 Drawing Sheets

DATA PROCESSING SYSTEM WITH MASTER AND SLAVE PROCESSORS

FIELD OF THE INVENTION

The present invention relates to a data processing system with master and slave processors for improved memory access.

BACKGROUND OF THE INVENTION

There has been a rapid increase in the clock speed of microprocessors. Presently available examples, such as the PowerPC 750 processor available from International Business Machines Corporation, can operate at clock speeds of 400MHz or more. As the speed of microprocessors has increased, the price of such microprocessors has decreased. It is now practical to embed high performance microprocessors in controller systems such as disk controller systems.

Such controller systems typically comprise a microprocessor or microcontroller connected to a memory subsystem and one or more controlled devices via an external bus system. The external buses usually operate at slower speeds than the processor. Therefore, it is difficult to operate all elements of the controllers system at the same high frequency. As more devices are attached to the bus, the load imposed on bus drivers of the external bus system is correspondingly increased. The increased load leads to a corresponding reduction in clock speed.

In some controller systems, the external bus system comprises a hierarchy of buses interconnected by bridge devices. The bridge devices isolate signals carried by the buses in the hierarchy. Each bus in the hierarchy interconnects a different group of devices This arrangement reduces the effective load on the external bus system. A reasonable clock speed can thus be maintained. However, the intermediate bridge devices introduce a delay or latency to memory accesses. These latencies reduce the processing speed of the processor, particularly in connection with communications between the processor and devices connected to extremes of the bus system. Further, there is usually arbitration associated with accesses to each bus in the bus system. Bus arbitration adds further latency. Further still, some buses, such as PCI buses, operate asynchronously relative to the devices they interconnect. Such asynchronous operation leads to introduction of further latency because additional clock cycles are used in providing valid data signals on the buses.

When the processor issues a write command, it is possible to reduce delay introduced by the bridge devices via buffers in the bridge devices. The buffers enable the waiting or "stall" time in the processor to be reduced to the time taken to send the write command through the bus which is directly connected to the processor. For example, caches in the memory subsystem usually send or "post" data cache line flush commands to the memory subsystem thereby enabling the processor to continue operation even as data is transferred between successive layers of the memory subsystem. Such "posted write" systems are well known.

For read commands however, there is no such satisfactory solution. In general, a read command incurs all the delays introduced by arbitration and synchronization at each bridge device in the bus system. Also, prior to execution of a read command, all posted write commands within each bridge device should be completed in case the region of memory being read is affected.

In the PCI-X bus system, strict ordering of read and posted write commands can be relaxed to reduce latency in execution of read commands. However, this can adversely affect execution of program code by the processor. Also, the latency inherent in read commands is still substantial.

Further difficulties arise if accesses through the bridge devices become too frequent and begin to approach the bandwidth of the intervening buses in the bus system. This situation arise when, for example, many short random accesses are made to remote memory locations. This problem can be alleviated by providing sufficient memory as close as possible to the processor. For example, the system may be provided with large L1 and L2 caches. However, in many controller systems, it is also desirable to place at least some memory close to other devices of the controller system, such as device interfaces. Such interfaces are also intolerant of latencies. Thus, if memory is too remote from these devices, performance will be adversely affected.

In a typical controller system, data which is written by a device interface and read by the processor is posted through bridge devices to memory located close to the processor. Memory which is written to by the processor, and read by the device interface chip is located close to the device interface chip. The amount of data that can be transferred between the processor and the device interface is limited to the capacity of the intervening bus system. Also, at least some memory must by both read from and written to by one or both of the processor and the device interface chip. Furthermore, there are practical limitations in terms of both addressability and cost on the amount of memory that can be assigned to the processor. An embedded disk controller typically requires a cache which is too large for direct connection to a fast processor at a reasonable cost. Conventionally, therefore, such caches have been attached to the processor via a memory controller remote from the processor. A problem associated with this arrangement is that accesses to the remote memory are very slow, typically taking between hundreds and thousands of clock cycles of the processor. Such times can exceed the execution time or code waiting to be executed by the processor. The imbalance between memory access time and processor cycle time increases as microprocessors get faster.

DISCLOSURE OF THE INVENTION

In accordance with the present invention, there is now provided a data processing system comprising: a master processor; a slave processor; a memory; and a bus subsystem interconnecting the master processor, the slave processor, and the memory; wherein the master processor is configured to generate, in response to a memory access instruction, a read request comprising a read command for execution by the slave processor to read data stored in a location in the memory specified by the memory access instruction, and to write the read request to the slave processor via the bus subsystem, and the slave processor is configured to execute the read command received in the read request from the master processor to obtain the data stored at the specified location in the memory and to write the data obtained to the master processor via the bus subsystem.

The present invention also extends to a controller system including such a data processing system. In a particularly preferred embodiment of the present invention, there is provided a mass storage controller system, such as a disk controller system, comprising such a data processing system.

Viewing the present invention from another aspect, there is now provided a method for reading data from a memory in a data processing system comprising a master processor, a slave processor, a memory, and a bus subsystem interconnecting the master processor, the slave processor, and the memory; the method comprising: generating, by the master processor, in response to a memory access instruction, a read request comprising a read command for execution by the slave processor to read data stored in a location in the memory specified by the memory access instruction; writing, by the master processor, the read request to the slave processor via the bus subsystem; executing, by the slave processor, the read command received in the read request from the master processor to obtain the data stored at the specified location in the memory; and, writing the data obtained to the master processor via the bus subsystem.

In a preferred embodiment of the present invention, there is provided a controller system having a relatively high performance master processor, and a relatively low performance slave processor all interconnected by a bus subsystem. The slave processor is disposed relative to the memory such that it experiences less read latency and uses less bus bandwidth during memory accesses than the master processor. In a particularly preferred embodiment of the present invention, the slave processor is embedded in a bridge device of the bus subsystem located closer to the memory. In use, the slave processor alleviates the burden of memory accesses otherwise imposed on the master processor. Thus, much of the cycle time of the slave processor is stalled on memory accesses. The slave processor therefore need not be especially sophisticated or fast.

It should be recognised that embodiments of the present invention differ from conventional so-called Non-Uniform memory Architecture ("NUMAs"). In a typical NUMA, two or more microprocessors with equal performance characteristics are employed to share workload. Such systems require complex programming and are therefore difficult to implement. Also, in a typical NUMA, each processor must be capable of issuing read commands. In embodiments of the present invention however, the slave processor is driven by the master processor. When the master processor requires data either to be read from or written to the memory, it issues a write command containing the required memory access to the slave processor. In receipt of such a write command, the slave processor performs the specified memory access on behalf of the master processor. Operations such as cache directory lookups can involve a large number of random memory accesses with which a high latency is typically associated. In preferred embodiments of the present invention, such a directory lookup request may be encoded in a message by the master processor and passed to the slave processor for handling. The slave processor then executes code associated with the message to perform the lookup, absorb the latency associated with the lookup operation, and return the result of the lookup operation to the master processor. In the mean time, the master processor is free to perform other tasks.

The slave processor can also improve system performance in performing other management tasks associated with the device interface chips. For example, the slave processor can be instructed to construct requests to device interface chips and handle data produced on execution of such requests by the device interface chips. In this arrangement, only abbreviated information need be communicated between the salve processor and the main processor. Thus traffic on the intervening bus subsystem can be reduced.

BRIEF DESCRIPTION OF THE DRAWINGS

Preferred embodiments of the present invention will now be described, by way of example only, with reference to the accompanying drawings in which.

DESCRIPTION OF THE PREFERRED EMBODIMENTS

Figure 1:
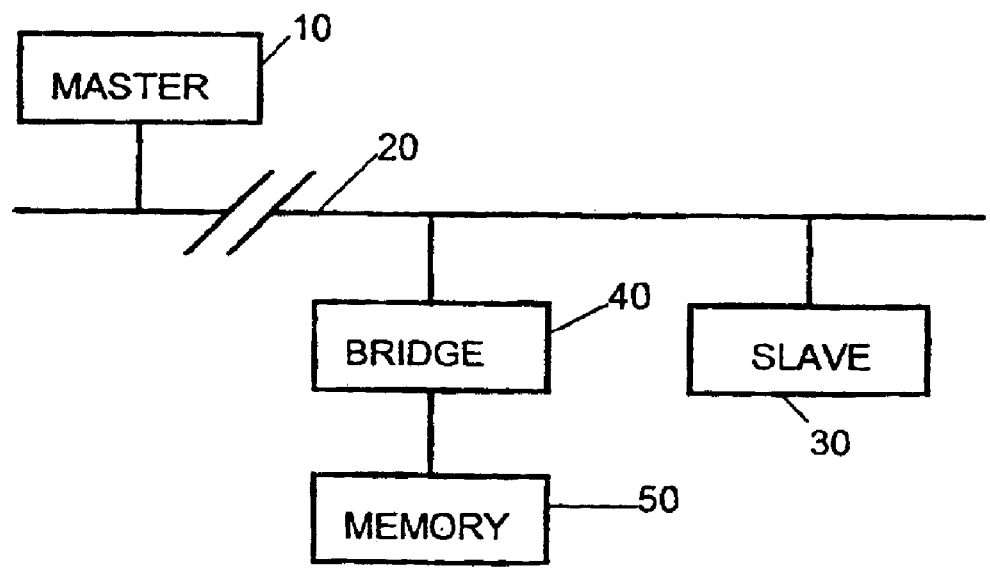
FIG. 1 is a block diagram of a data processing system embodying the present invention.

Referring first to FIG. 1 an example of a data processing system of the present invention comprises a master processor 10 coupled to a bus subsystem 20. The bus subsystem 20 is also coupled to a memory 50 via a bridge device 40. A slave processor 30 is also connected to the bus subsystem 20. The master processor 10 may be implemented by a microprocessor such as a PowerPC processor 750 available from International Business Machines Corporation operating at a clock frequency of 400MHz. The slave processor 30 may also be implemented by a microprocessor such as a PowerPC processor 403 available from International Business Machines Corporation operating at a clock frequency of 100MHz.

Figure 2:
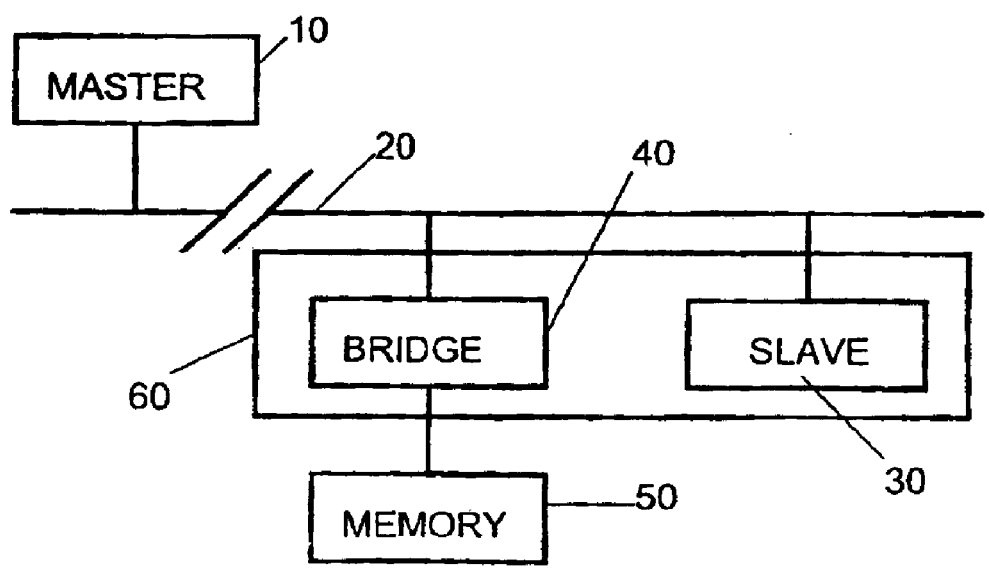
FIG. 2 is a block diagram of a data processing system embodying the present invention.

In the example of the present invention hereinbefore described with reference to FIG. 1, the slave processor 30 is separate from the bridge device 40. However, referring to now to FIG. 2, it will be appreciated that, in other embodiments of the present invention, the slave processor 30 and the bridge device 40 may be integrated in a single chip package 60. For example, in a particularly preferred embodiment of the present invention, the slave processor 30 is embedded in the bridge device 40.

Figure 3:
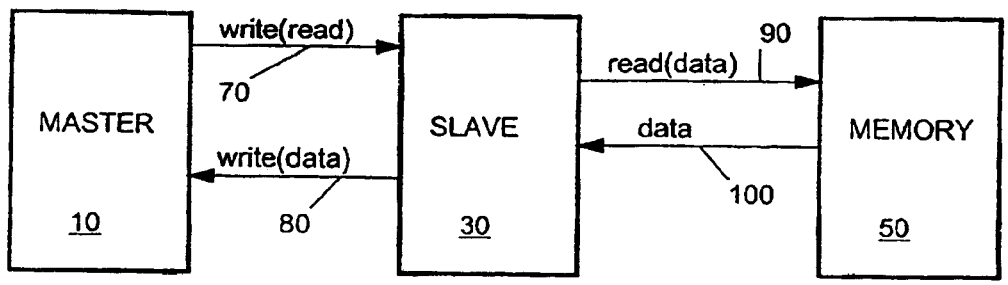
FIG. 3 is block diagram of a data processing system embodying the present invention with command signals added.

In the preferred embodiments of the present invention hereinbefore described, the master processor 10 and the slave processor 30 are each configured by computer program control code to cooperate in providing access to data stored in the memory 60 in a manner which will now be described with reference to FIG. 3. Specifically, when the master processor 10 requires data stored in the memory 60, it writes a read command 70 to the slave processor 40 via the bus subsystem 20. The read command 70 specifies the location in memory 50 to be read. The slave processor 30 executes to read command 70 received from the master processor 10 to retrieve, at 80, the required data, at 90, from the memory So via the bridge device 40 and the bus subsystem 20. The slave processor 30 then writes, at 100, the retrieved data to the master processor 10 via the bus subsystem 20.

Figure 4:
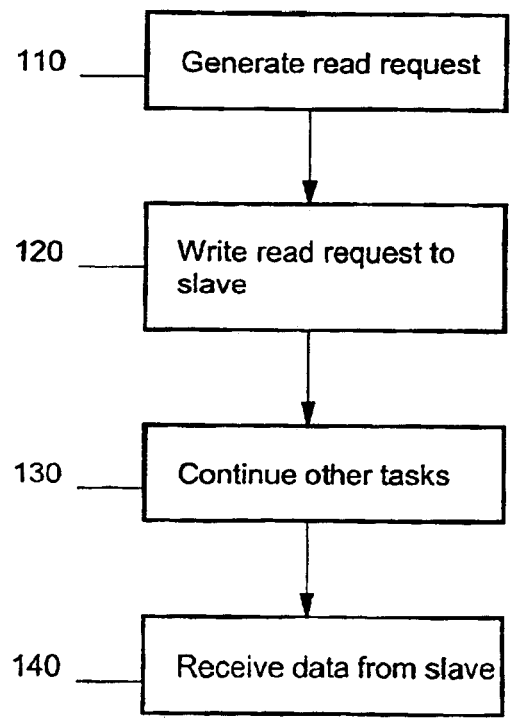
FIG. 4 is a flow chart corresponding to a master processor of an embodiment of the present invention.

An example of the aforementioned program control code configuring the master processor 10 will now be described with reference to FIG. 4. When data is required to be read from the memory 50, the master processor 20 generates, at 110, a corresponding read request for execution by the slave processor 3. At 120, the master processor 10 writes the read request to the slave processor. Advantageously, the master processor 10 does not then have to wait or otherwise stall until the requested data is returned from the memory So. This is because the master processor 10 has effectively delegated execution of the read request to the slave processor 20. The slave processor 30 absorbs any waiting, stalling or other latency associated with the memory access. Thus, at 130, once the read request is sent, the master processor 10 is free to perform other tasks, at least until the requested data arrives from the slave processor 30.

Figure 5:
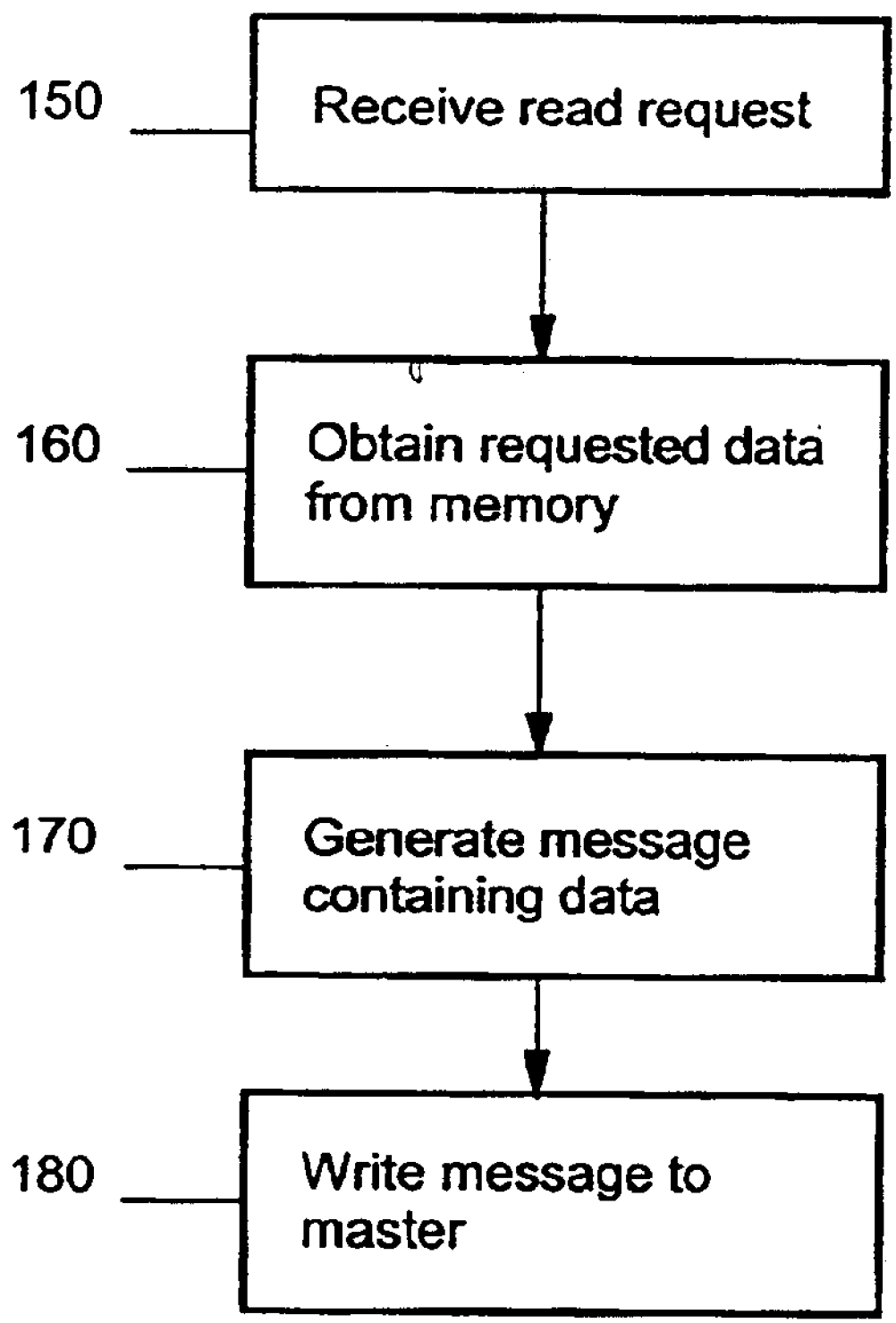
FIG. 5 is a flow chart corresponding to a slave processor of an embodiment of the present invention.

An example of the aforementioned program code configuring the slave processor 30 will now be described with reference to FIG. 5. At 150, on receipt of a read request from the master processor 10, the salve processor 30 extracts the read command from the read request to determine the location or locations of the memory 50 from which data is to be read. At 160, the slave processor 30 executes the extracted read command to obtain the required data from the memory 50 via the bus subsystem 20 and the bridge device 40. The slave processor 30 absorbs any latency or waiting associated with execution of the read command. At 170, the slave processor 30 generates a message containing the data obtained from the memory 50 ad, at 180, writes the message to the master processor 10, thereby supplying the master processor 10 with the data originally requested.

Figure 6:
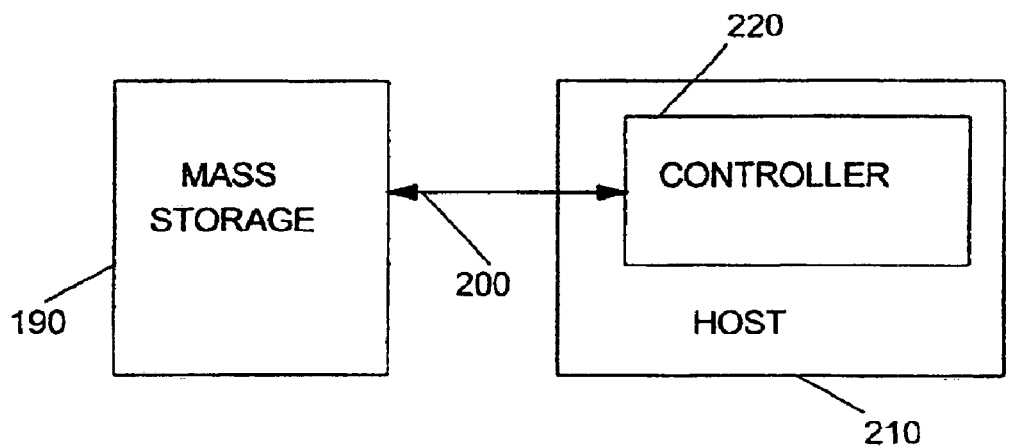
FIG. 6 is a block diagram of a mass storage system embodying the present invention; and, FIG. 7 is a block diagram of another mass storage system embodying the present invention.
Figure 7:
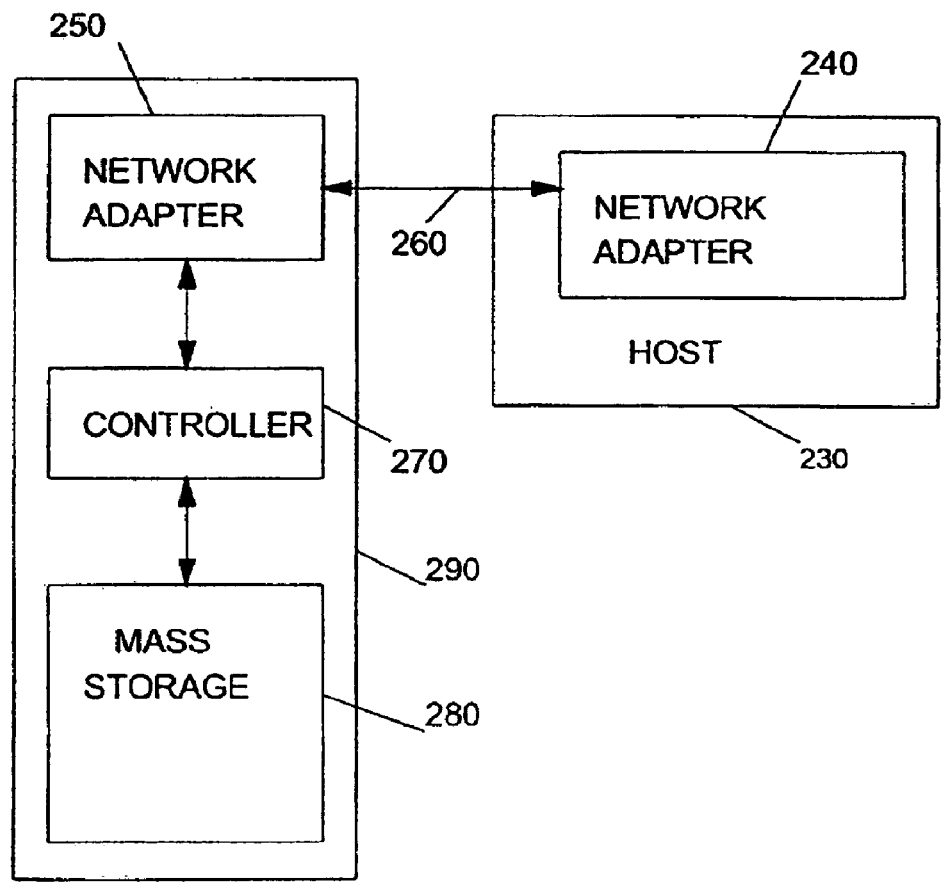

Data processing systems embodying the present invention are particularly although not exclusively beneficial in controller applications such as mass storage controller applications. For example, referring to FIG. 6, a mass storage system embodying the present invention comprises a controller 220 including a data processing system as thereinbefore described. The controller 220 comprises an adapter card installed in the bus architecture of a host computer system 210. Examples of such bus architectures includes the well known PCI, ISA plug and play and EISA bus architectures. The controller 220 is coupled to a remote mass storage device 190 via a communication link 200 such as a SCSI or SSA communication link. The mass storage device 190 comprises one or more storage elements such as magnetic or optical disks or the like. Referring to FIG. 7, in another example of a mass storage system embodying the present invention, a controller 270 including a data processing system as thereinbefore described is installed in a remote unit 290 in which there is also housed a network adapter 250 and a mass storage device 280 as thereinbefore described. Both network adapter 250 and the mass storage device 280 are connected to the controller 270. The network adapter 250 is also connected, via a communication link 260 such as a Fiber Channel communication link to another network adapter 240 installed in a host computer 230.

What is claimed is:

1. A data processing system allowing a master processor to access a memory by using a slave processor to access the memory while the master processor continues other processing tasks to allow the slave processor to absorb any latency or waiting while the slave processor accesses the memory and writes the data from memory to the master processor comprising: a master processor; a slave processor; a memory; and a bus subsystem interconnecting the master processor, the slave processor, and the memory; wherein the master processor is configured to generate, in response to a memory access instruction, a read request comprising a read command for execution by the slave processor to read data stored in a location in the memory specified by the memory access instruction while the master processor continues other processing tasks while the slave processor accesses the memory and writes the data from memory to the master processor, and to write the read request to the slave processor via the bus subsystem, and the slave processor is configured to execute the read command received in the read request from the master processor to obtain the data stored at the specified location in the memory and to write the data obtained to the master processor via the bus subsystem while the master processor continues other processing tasks to allow the slave processor to absorb any latency or waiting associated with execution of the read command.

2. A data processing system as claimed in claim 1, wherein the bus subsystem comprises two buses interconnected by a bridge device and the slave processor is integrated in the bridge device.

3. A disk controller comprising: a master processor; a slave processor; a memory; and a bus subsystem interconnecting the master processor, the slave processor, and the memory; wherein the master processor is configured to generate, in response to a memory access instruction, a read request comprising a read command for execution by the slave processor to read data stored in a location in the memory specified by the memory access instruction while the master processor continues other processing tasks to allow the slave processor to absorb any latency or waiting while the slave processor accesses the memory and writes the data from memory to the master processor, and to write the read request to the slave processor via the bus subsystem, and the slave processor is configured to execute the read command received in the read request from the master processor to obtain the data stored at the specified location in the memory and to write the data obtained to the master processor via the bus subsystem while the master processor continues other processing tasks to allow the slave processor to absorb any latency or waiting associated with execution of the read command.

4. A method for reading data from a memory in a data processing system comprising a master processor, a slave processor, a memory, and a bus subsystem interconnecting the master processor, the slave processor, and the memory, the data processing system allowing a master processor to access a memory by using a slave processor to access the memory while the master processor continues other processing tasks to allow the slave processor to absorb any latency or waiting while the slave memory accesses the memory and writes the data from memory to the master processor; the method comprising:

generating, by the master processor, in response to a memory access instruction, a read request comprising a read command for execution by the slave processor to read data stored in a location in the memory specified by the memory access instruction while the master processor continues other processing tasks while the slave processor accesses the memory and writes the data from memory to the master processor;

writing, by the master processor, the read request to the slave processor via the bus subsystem;

executing, by the slave processor, the read command received in the read request from the master processor to obtain the data stored at the specified location in the memory while the master processor continues other processing tasks to allow the slave processor to absorb any latency or waiting associated with execution of the read command; and, writing the data obtained to the master processor via the bus subsystem.

* * * * *